(12) United States Patent
Miyaura et al.

(10) Patent No.: US 8,538,664 B2
(45) Date of Patent: Sep. 17, 2013

(54) CONTROLLER FOR DIESEL ENGINE AND METHOD OF CONTROLLING DIESEL ENGINE

(75) Inventors: Takeshi Miyaura, Toyota (JP); Yasuyuki Terada, Toyota (JP); Atsushi Morikawa, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 805 days.

(21) Appl. No.: 12/738,461

(22) PCT Filed: Nov. 13, 2008

(86) PCT No.: PCT/IB2008/003050
§ 371 (c)(1),
(2), (4) Date: Apr. 16, 2010

(87) PCT Pub. No.: WO2009/063298
PCT Pub. Date: May 22, 2009

(65) Prior Publication Data
US 2010/0268444 A1   Oct. 21, 2010

(30) Foreign Application Priority Data
Nov. 14, 2007   (JP) .................................. 2007-295852

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |
| G06F 19/00 | (2011.01) |
| G06G 7/70 | (2006.01) |

(52) U.S. Cl.
USPC .............. 701/105; 701/99; 123/299; 123/304

(58) Field of Classification Search
USPC .................... 123/299, 300, 304, 305, 399.12, 123/399.14, 399.19, 334, 402, 406.11, 406.14, 123/406.16, 406.12, 406.23, 406.24, 406.26, 123/406.27, 406.29–406.36; 701/99, 101–105, 701/111
See application file for complete search history.

(56) References Cited

U.S. PATENT DOCUMENTS
4,722,310 A * 2/1988 Igashira et al. ............... 123/300
6,947,830 B1 * 9/2005 Froloff et al. ................. 701/111
(Continued)

FOREIGN PATENT DOCUMENTS
| CN | 1906390 A | 1/2007 |
|---|---|---|
| CN | 101029603 A | 9/2007 |

(Continued)

*Primary Examiner* — Stephen K Cronin
*Assistant Examiner* — Sherman Manley
(74) *Attorney, Agent, or Firm* — Sughrue Mion, PLLC (57) ABSTRACT

An electronic controller for a diesel engine (1) performs primary injection control in which primary injection of fuel is controlled based on an operational status of the diesel engine and additional injection control in which additional injection of the fuel is controlled for estimation of a cetane number of the fuel. The electronic controller includes a control means that, as the additional injection control, causes a plurality of fuel injections to be performed at different injection timings as the additional injection, calculates the amount of increase in torque of a crankshaft (14) due to each of the fuel injections, estimates injection timing at which misfiring starts to occur based on a trend of variation in the calculated torque increase amount as the injection timing of the fuel injections is shifted in one direction, and estimates the cetane number of the fuel based on the estimated injection timing.

22 Claims, 9 Drawing Sheets

(56) References Cited

U.S. PATENT DOCUMENTS

| | | | |
|---|---|---|---|
| 7,027,906 B2* | 4/2006 | Araki | 701/104 |
| 7,028,532 B2* | 4/2006 | Shinzawa | 73/35.02 |
| 7,401,591 B2* | 7/2008 | Yamaguchi et al. | 123/299 |
| 7,444,984 B2* | 11/2008 | Yamaguchi et al. | 123/406.47 |
| 7,621,174 B2* | 11/2009 | Takaku | 73/114.53 |
| 7,630,824 B2* | 12/2009 | Hirata | 701/105 |
| 7,926,331 B2* | 4/2011 | Tsutsumi et al. | 73/114.38 |
| 7,987,696 B2* | 8/2011 | Kuronita et al. | 73/35.02 |
| 8,042,517 B2* | 10/2011 | Nakajima | 123/406.41 |
| 8,074,503 B2* | 12/2011 | Tsutsumi et al. | 73/114.38 |
| 2001/0056322 A1* | 12/2001 | Yoshizawa et al. | 701/104 |
| 2007/0044759 A1* | 3/2007 | Yamaguchi et al. | 123/406.3 |
| 2007/0079647 A1* | 4/2007 | Aoyama | 73/35.02 |
| 2007/0151542 A1* | 7/2007 | Yamaguchi et al. | 123/299 |
| 2007/0204674 A1 | 9/2007 | Takaku | |
| 2010/0162805 A1* | 7/2010 | Yoeda | 73/114.63 |
| 2010/0236524 A1* | 9/2010 | Bohnig et al. | 123/445 |
| 2010/0268444 A1* | 10/2010 | Miyaura et al. | 701/105 |

FOREIGN PATENT DOCUMENTS

| | | |
|---|---|---|
| EP | 1 020 629 A2 | 7/2000 |
| EP | 1 760 299 A1 | 3/2007 |
| EP | 1 793 110 A2 | 6/2007 |
| EP | 1 830 055 A1 | 9/2007 |
| JP | 2001-152948 A | 6/2001 |
| JP | 2004-340026 A | 12/2004 |
| JP | 2005-036788 A | 2/2005 |
| JP | 2005-048703 A | 2/2005 |
| JP | 2005-344557 A | 12/2006 |
| JP | 2007-033249 A | 2/2007 |
| JP | 2007-154699 A | 6/2007 |
| JP | 2007-154802 A | 6/2007 |
| WO | 2005/119034 A1 | 12/2005 |

* cited by examiner

| MISFIRE POINT(°CA) | -6 | -5 | -4 | -3 | -2 | -1 | 0 | 1 |
|---|---|---|---|---|---|---|---|---|
| CETANE NUMBER | 40 | 42 | 44 | 46 | 48 | 50 | 52 | 54 |

FIG. 9B

| CETANE NUMBER | 40 | 42 | 44 | 46 | 48 | 50 | 52 | 54 |
|---|---|---|---|---|---|---|---|---|
| CORRECTION AMOUNT $\Delta T_{main}$(°CA) | 3 | 2.5 | 2 | 1.5 | 1 | 0 | 0 | 0 |

CONTROLLER FOR DIESEL ENGINE AND METHOD OF CONTROLLING DIESEL ENGINE

BACKGROUND OF THE INVENTION

1. Field of the Invention

The invention relates to a controller for a diesel engine and a method of controlling a diesel engine, in which fuel injection control is performed.

2. Description of the Related Art

In a diesel engine, fuel injected into a combustion chamber by an injector is compressed and ignited after a certain period of time has elapsed since the injection, that is, after an ignition lag has elapsed since the injection. In order to improve the engine power and the emission of diesel engines, a controller that controls fuel injection timing, the amount of fuel injection, etc. based on the operational status of the engine with such ignition lag taken into consideration is widely used (see Japanese Patent Application Publication No. 2001-152948, for example).

With regard to the fuel used in diesel engines, the lower the cetane number is, the longer the ignition lag is. Thus, even when the optimum fuel injection timing and the optimum amount of fuel injection are set based on a given standard cetane number by the time the diesel engine is shipped, for example, if a fuel, such as a winter fuel, that has a lower cetane number is supplied to the fuel tank, the fuel ignition timing is retarded and the combustion condition is deteriorated, which can lead to misfiring in the worst case. In order to suppress the occurrence of such a problem, it is preferable that the fuel injection timing, the amount of fuel injection, etc. be adjusted based on the cetane number of fuel. Note that in order to suitably perform such adjustment, it is necessary to accurately estimate the cetane number of fuel.

SUMMARY OF THE INVENTION

The invention provides a controller for a diesel engine and a method of controlling a diesel engine, with which it is possible to accurately estimate the cetane number of fuel.

A first aspect of the invention is a controller for a diesel engine that performs primary injection control in which primary injection of fuel is controlled based on an operational status of the diesel engine and additional injection control in which additional injection of the fuel is controlled for estimation of a cetane number of the fuel. The diesel engine controller includes a control means that, as the additional injection control, causes a plurality of fuel injections to be performed at respectively different injection timings, calculates the amount of increase in torque of an engine output shaft due to each of the plurality of fuel injections, estimates injection timing at which misfiring starts to occur based on the trend of variation in the calculated amount of increase in torque as the injection timing of the plurality of fuel injections is shifted in one direction, and estimates the cetane number of the fuel based on the estimated injection timing.

When misfiring starts to occur as the injection timing is shifted in the additional injection control, a trend appears in which the amount of increase in torque of the engine output shaft owing to combustion of fuel significantly drops. Thus, with the above configuration, it is possible to accurately estimate the injection timing at which misfiring starts to occur based on the trend of variation in the amount of increase in torque as the injection timing of the plurality of fuel injections performed in the additional injection control is shifted in one direction. Because the lower the cetane number of the fuel is, the more the injection timing at which misfiring starts to occur shifts to the advance side, it is possible to accurately estimate the cetane number of fuel based on the estimated injection timing.

A configuration may be adopted, for example, in which the trend of variation in the amount of increase in torque is a trend of variation in the amount of increase in torque as the injection timing is shifted so that the injection timing of the plurality of fuel injections is shifted from an advance side to a retard side. When such a configuration is adopted, it is possible to easily and accurately estimate the injection timing at which misfiring starts to occur.

The control means may determine, to be the injection timing at which misfiring starts to occur, injection timing at which the amount of increase in torque sharply varies in the trend of variation in the calculated amount of increase in torque.

When misfiring starts to occur as the injection timing is shifted in the additional injection control, a trend appears in which the amount of increase in torque of the engine output shaft owing to fuel injections in the additional injection control rapidly drops as compared to the case in which combustion is normally performed.

Thus, with the above configuration, it is possible to accurately estimate the injection timing at which misfiring starts to occur by determining, to be the injection timing at which misfiring starts to occur, the injection timing at which the amount of increase in torque sharply varies in the trend of variation in the calculated amount of increase in torque.

A second aspect of the invention is a controller for a diesel engine that performs primary injection control in which primary injection of fuel is controlled based on an operational status of the diesel engine and additional injection control in which additional injection of the fuel is controlled for estimation of a cetane number of the fuel. The diesel engine controller includes a control means that, as the additional injection control, causes a plurality of fuel injections to be performed at respectively different injection timings, calculates the amount of increase in rotational speed of an engine output shaft due to each of the plurality of fuel injections, estimates injection timing at which misfiring starts to occur based on the trend of variation in the calculated amount of increase in rotational speed as the injection timing of the plurality of fuel injections is shifted in one direction, and estimates the cetane number of the fuel based on the estimated injection timing.

With the above configuration, it is possible to accurately estimate the injection timing at which misfiring starts to occur based on the trend of variation in the amount of increase in torque as the injection timing of the plurality of fuel injections performed in the additional injection control is shifted in one direction. Because the lower the cetane number of the fuel is, the more the injection timing at which misfiring starts to occur shifts to the advance side, it is possible to accurately estimate the cetane number of fuel based on the estimated injection timing.

A configuration may be adopted, for example, in which the trend of variation in the amount of increase in rotational speed is a trend of variation in the amount of increase in rotational speed as the injection timing is shifted so that the injection timing of the plurality of fuel injections is shifted from an advance side to a retard side. When such a configuration is adopted, it is possible to easily and accurately estimate the injection timing at which misfiring starts to occur.

In the diesel engine controller according to the second aspect, the control means may determine, to be the injection timing at which misfiring starts to occur, injection timing at which the amount of increase in rotational speed sharply varies in the trend of variation in the calculated amount of increase in rotational speed.

When misfiring starts to occur as the injection timing is shifted in the additional injection control, a trend appears in which the amount of increase in rotational speed of the engine output shaft owing to fuel injections in the additional injection control rapidly drops as compared to the case in which combustion is normally performed.

Thus, with the above configuration, it is possible to accurately estimate the injection timing at which misfiring starts to occur by determining, to be the injection timing at which misfiring starts to occur, the injection timing at which the amount of increase in rotational speed sharply varies in the trend of variation in the calculated amount of increase in rotational speed.

The control means may start the additional injection control provided that a condition for performing the primary injection control is not satisfied.

With this configuration, the additional injection control is performed provided that a condition for performing the primary injection control is not satisfied, so that there is no variation in either the torque or the rotational speed of the engine output shaft due to the primary injection control while the additional injection control is performed. Thus, it is possible to easily and accurately detect the amount of increase in torque or rotational speed of the engine output shaft due to fuel injections in the additional injection control.

In a diesel engine mounted on a vehicle, the primary injection control is stopped while the vehicle is decelerating and fuel cut is being performed. Thus, a configuration may be adopted in which the additional injection control is started provided that the vehicle is decelerating and fuel cut is being performed.

The control means may determine whether refueling a fuel tank for the diesel engine has been performed after preceding additional injection control is performed, and allow subsequent additional injection control to be performed on a condition that a result to the effect that refueling has been performed is obtained in this determination.

With this configuration, the additional injection control is surely performed when refueling has been performed, that is, when there is a possibility that the cetane number of the fuel in the fuel tank is changed, so that it is possible to properly detect the change in the cetane number of fuel.

In the diesel engine controllers according to the first and second aspects, the primary injection may include a main injection and a pilot injection that is performed before the main injection, and an injection manner of at least one of the main injection and the pilot injection may be adjusted so that the lower the cetane number estimated by the control means is, the more advanced the timing of injection of fuel that is injected by the main injection is.

The lower the cetane number of fuel is, the longer the ignition lag of injected fuel is. In consideration of this fact, in the above configuration, an injection manner of at least one of the main injection and the pilot injection is adjusted so that the lower the cetane number is, the more advanced the timing of ignition of fuel that is injected by the main injection is. Thus, it is possible to suppress retardation of ignition timing of fuel due to reduction in the cetane number, and it is possible to suppress deterioration of fuel combustion condition due to the retardation of fuel ignition timing.

Timing of injection of fuel injected by the main injection may be adjusted so that the lower the estimated cetane number is, the more advanced the timing of injection of fuel injected by the main injection is.

With this configuration, the timing of injection of fuel injected by the main injection is adjusted so that the lower the cetane number is, the more advanced the timing of injection of fuel injected by the main injection is, and therefore, it is possible to suppress the retardation of fuel ignition timing even when the fuel ignition lag is elongated due to reduction in the cetane number.

Injection pressure at which the main injection is performed may be adjusted so that the lower the estimated cetane number is, the higher the injection pressure is.

As the injection pressure of the main injection increases, the fuel ignition lag is shortened because the fuel injected by the main injection is well diffused and mixing of fuel and air is facilitated. In consideration of this fact, in the above configuration, injection pressure at which the main injection is performed is adjusted so that the lower the cetane number is, the higher the injection pressure is. Thus, it is possible to suppress retardation of ignition timing of fuel due to reduction in the cetane number.

The injection amount for the pilot injection may be adjusted so that the lower the estimated cetane number is, the greater the injection amount is.

As the pilot injection amount increases, the fuel ignition lag is shortened because the effect, brought about by a pilot injection, of activating the fuel injected by a main injection is enhanced. In consideration of this fact, in the above configuration, the amount of injection of the pilot injection is adjusted so that the lower the estimated cetane number is, the greater the injection amount of the pilot injection is. Thus, it is possible to suppress retardation of ignition timing of fuel due to reduction in the cetane number.

The interval between the pilot injection and the main injection may be adjusted so that the lower the estimated cetane number is, the longer the interval is.

As the interval between the pilot injection and the main injection increases, the fuel ignition lag is shortened because the effect, brought about by a pilot injection, of activating the fuel injected by a main injection is enhanced. In consideration of this fact, in the above configuration, the injection timing of the pilot injection is adjusted so that the lower the estimated cetane number is, the more advanced the injection timing of the pilot injection is. Thus, it is possible to suppress retardation of ignition timing of fuel due to reduction in the cetane number.

A third aspect of the invention relates to a method of controlling a diesel engine. The diesel engine controlling method includes: performing primary injection control in which primary injection of fuel is controlled based on an operational status of the diesel engine; and performing additional injection control in which additional injection of the fuel is controlled for estimation of a cetane number of the fuel. The performing additional injection control includes: causing a plurality of fuel injections to be performed at respectively different injection timings; calculating the amount of increase in torque of an engine output shaft due to each of the plurality of fuel injections; estimating injection timing at which misfiring starts to occur based on the trend of variation in the calculated amount of increase in torque as the injection timing of the plurality of fuel injections is shifted in one direction; and estimating the cetane number of the fuel based on the estimated injection timing.

A fourth aspect of the invention relates to a method of controlling a diesel engine. The diesel engine controlling method includes: performing primary injection control in which primary injection of fuel is controlled based on an operational status of the diesel engine; and performing additional injection control in which additional injection of the fuel is controlled for estimation of a cetane number of the fuel. The performing additional injection control includes: causing a plurality of fuel injections to be performed at respectively different injection timings; calculating the amount of increase in rotational speed of an engine output shaft due to each of the plurality of fuel injections; estimating injection timing at which misfiring starts to occur based on the trend of variation in the calculated amount of increase in rotational speed as the injection timing of the plurality of fuel injections is shifted in one direction; and estimating the cetane number of the fuel based on the estimated injection timing.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
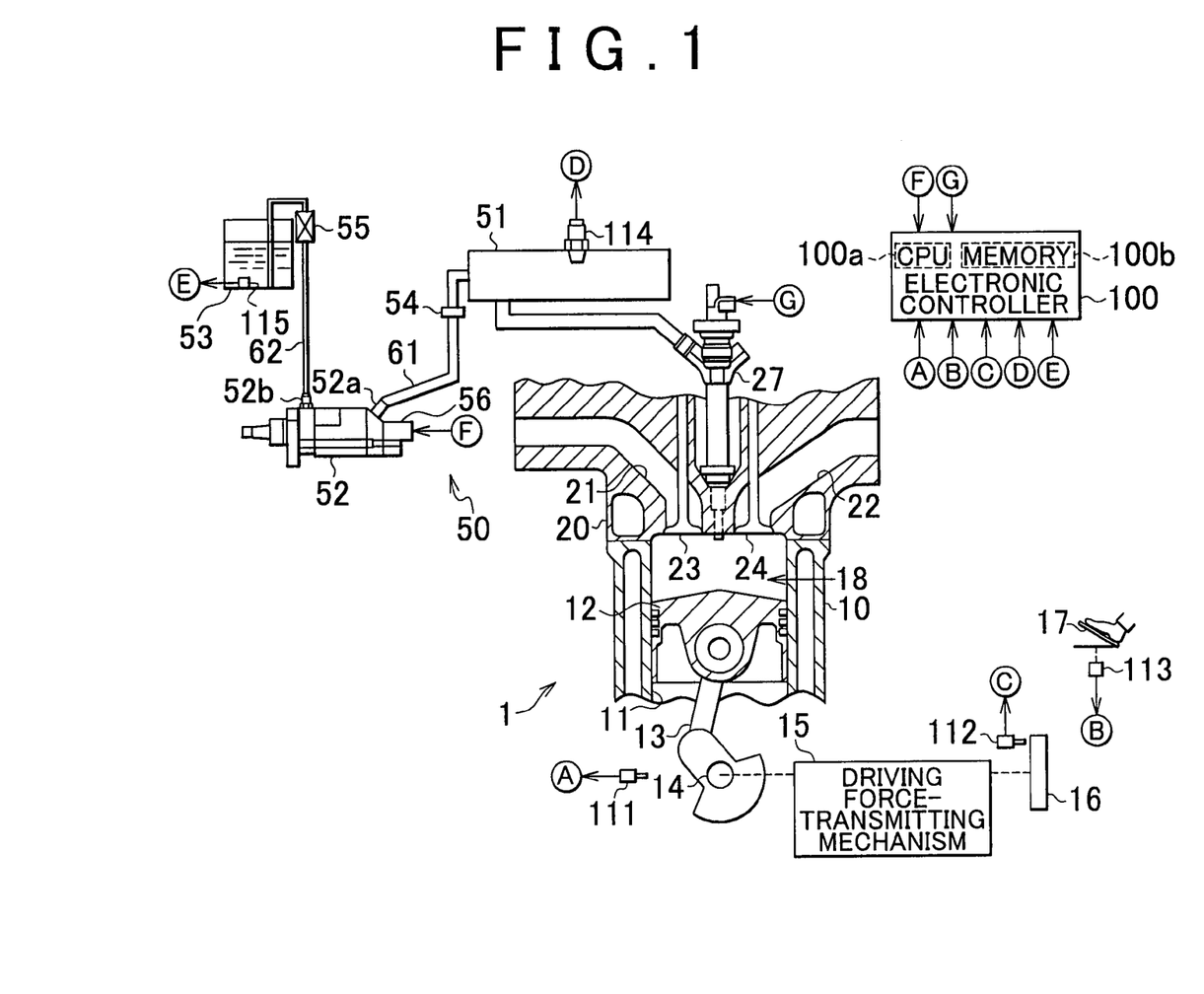
FIG. 1 is a configuration diagram schematically showing an embodiment of a controller for a diesel engine mounted on a vehicle according to the invention.

An embodiment in which the invention is applied to a controller for a diesel engine for a vehicle will be described with reference to FIGS. 1 to 9. FIG. 1 schematically shows a diesel engine mounted on a vehicle and a controller for the diesel engine. As shown in FIG. 1, a cylinder block 10 of the diesel engine 1 has a plurality of cylinders 11 formed therein, one of which is shown in FIG. 1, and a piston 12 that reciprocates in the cylinder 11 is provided in each cylinder 11. The piston 12 is connected to a crankshaft 14 through a connecting rod 13. When the vehicle is running, torque of the crankshaft 14 is transmitted to a driving wheel 16 through a driving force-transmitting mechanism 15. The driving force-transmitting mechanism 15 is constituted of a transmission, a differential gear unit, an axle shaft, etc.

A crank sensor 111 for detecting rotational speed of the crankshaft 14 (hereinafter simply referred to as the "engine speed NE") is provided near the crankshaft 14. A vehicle speed sensor 112 for detecting rotational speed of the driving wheel 16, that is, travel speed of the vehicle (hereinafter referred to as the "vehicle speed V") is provided near the driving wheel 16. In addition, an accelerator sensor 113 for detecting the amount Accp of depression of an accelerator pedal 17 is provided near the accelerator pedal 17 of the vehicle. Detection signals from the crank sensor 111, the vehicle speed sensor 112, and the accelerator sensor 113 are received by an electronic controller 100 that includes a microcomputer and comprehensively controls the diesel engine 1. The microcomputer that is the core of the electronic controller 100 includes: a central processing unit 100a that performs numerical calculations, information processing, etc, with the use of control programs for various control operations; and a memory 100b that stores the control programs, various maps that are required to execute the programs, results obtained by executing the control programs, etc.

A cylinder head 20 is mounted on the cylinder block 10. A combustion chamber 18 is defined by the cylinder block 10, the cylinder head 20, and the piston 12. In the cylinder head 20, an intake port 21 and an exhaust port 22 that are connected to the combustion chamber 18 are formed. In addition, an intake valve 23 and an exhaust valve 24 that switch the state of the ports 21 and 22 and the combustion chamber 18 between a connected state and an interrupted state, are provided for these ports, respectively. During an intake stroke of the engine, the intake valve 23 is opened and air is therefore taken into the combustion chamber 18 through the intake port 21. On the other hand, during an exhaust stroke of the engine, the exhaust valve 24 is opened and burned gas in the combustion chamber 18 is therefore discharged through the exhaust port 22.

A direct injection-type injector 27 is provided in the cylinder head 20, and the fuel supplied through a fuel supply system 50 is directly injected into the combustion chamber 18 through the injector 27 and then compressed and ignited.

The fuel supply system 50 includes a common rail 51 that is connected to the injector 27, a supply pump 52 that is driven by the crankshaft 14, and a fuel tank 53 that stores fuel. Formed in the supply pump 52 are a discharge port 52a that is connected to the common rail 51 through a supply pipe 61, and an intake port 52h that is connected to the fuel tank 53 through an intake pipe 62. A check valve 54 for preventing fuel from flowing from the common rail 51 side to the discharge port 52a side is provided on the supply pipe 61. The intake pipe 62 is provided with a filter 55 for filtering fuel.

The supply pump 52 is provided with a plunger that reciprocates in synchronization with rotation of the crankshaft 14, and the fuel in the fuel tank 53 is taken in through the intake pipe 62 and then pressurized and sent to the common rail 51, with the use of the reciprocation of the plunger. The amount of fuel supplied by the supply pump 52 is regulated by the open/close operation of a pressure control valve 56 that is provided near the discharge port 52a.

A rail pressure sensor 114 for detecting the internal pressure of the common rail 51 (hereinafter referred to as the "rail pressure PR") is provided in the common rail 51. The fuel tank 53 is provided with a fuel level sensor 115 for detecting the fuel level in the fuel tank 53. Detection signals from the rail pressure sensor 114 and the fuel level sensor 115 are received by the electronic controller 100. The electronic controller 100 controls the pressure control valve 56 and the injector 27 based on the detection signals from the above sensors, that is, based on the operational status of the engine, to maintain the injection pressure and the injection timing of fuel injection performed by the injector 27 at a desired value and desired timing.

The fuel injected into the combustion chamber 18 by the injector 27 is compressed and ignited after a certain period of time has elapsed since the injection, that is, after an ignition lag has elapsed since the injection. When such an ignition lag is relatively long, the fuel injected into the combustion chamber 18 is ignited all at once at a certain instant, and the pressure and temperature at which the fuel is combusted rapidly increase. As a result, the combustion noise becomes louder, and the amount of NOx (nitrogen oxide) produced is increased.

The electronic controller 100 controls the injector 27 so as to perform injection of a little fuel, so-called pilot injection, prior to a main injection to obtain engine output, to shorten the ignition lag of the fuel that is injected by the main injection. Note that main injection and pilot injection are hereinafter collectively referred to as the primary injection.

Figure 2:
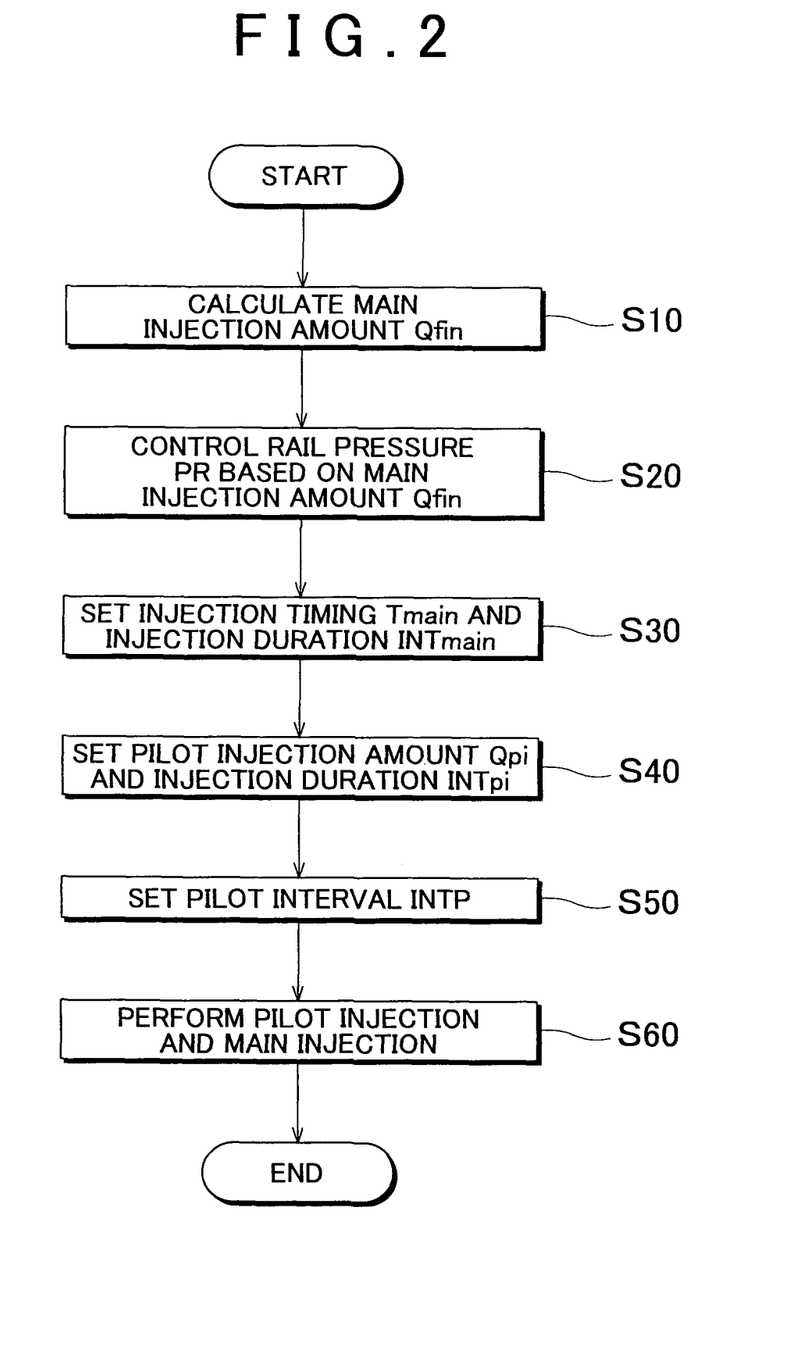
FIG. 2 is a flow chart showing a procedure of primary injection control performed by the controller of the embodiment.

A procedure of controlling the primary injection will be described with reference to the flow chart of the "primary injection control process" shown in FIG. 2. In this process, first, the amount of fuel injection during a main injection (hereinafter referred to as the "main injection amount Qfin") is calculated based on the amount Accp of depression of the accelerator pedal 17, the engine speed NE, etc. (step S10). In addition, the desired value of the rail pressure PR is set based on the main injection amount Qfin, and the pressure control valve 56 is feedback-controlled so that the actual value of the rail pressure PR that is detected by the rail pressure sensor 114 is brought to the desired value (step S20).

Next, injection timing Tmain and injection duration INTmain of the main injection are set based on the main injection amount Qfin and the rail pressure PR (step S30), and then the amount of fuel injection during a pilot injection (hereinafter referred to as the "pilot injection amount Qpi") and injection duration INTpi corresponding to the pilot injection amount Qpi are set (step S40). The interval between the pilot injection and the main injection, that is, pilot interval INTP, is set based on the main injection amount Qfin, etc. (step S50), and the pilot injection and the main injection are sequentially performed (step S60).

The desired value of the rail pressure PR, the main injection amount Qfin, the injection timing Tmain, the injection duration INTmain, the pilot injection amount Qpi, the injection duration INTpi, and the pilot interval INTP are separately calculated based on a plurality of maps for calculation that correspond to these parameters. These calculation maps are obtained based on experimental results, etc. and stored in the memory 100b in advance.

When the pilot injection is performed prior to the main injection in this way, the fuel ignition lag is shortened, and it is possible to suppress the increase in combustion noise and the increase in the amount of NOx produced that are due to the ignition lag.

However, as described above, with regard to the fuel used in the diesel engine 1, the lower the cetane number CEN is, the longer the ignition lag is. Assume that the maps for calculating the parameters are prepared based on a given standard cetane number CEN0, for example, and stored in the memory 100b in advance. In this case, even when the primary injection is performed as described above, if a fuel, such as a winter fuel, that has a cetane number CEN lower than the standard cetane number CEN0 is supplied to the fuel tank 53, the fuel ignition timing is retarded, which leads to increase in combustion noise and increase in the amount of NOx produced. In addition, when a fuel of which the cetane number CEN is extremely low is supplied, and the fuel ignition timing is significantly shifted to the retard side relative to the top dead center, there is a possibility that a misfire occurs.

Thus, the electronic controller 100 according to this embodiment performs additional injection control in addition to primary injection control, estimates the cetane number CEN of fuel through the additional injection control, and adjusts, based on the cetane number CEN estimated, the injection timing Tmain of the main injection that is calculated in the primary injection control, whereby occurrence of the above-described problems is suppressed.

Figure 3:
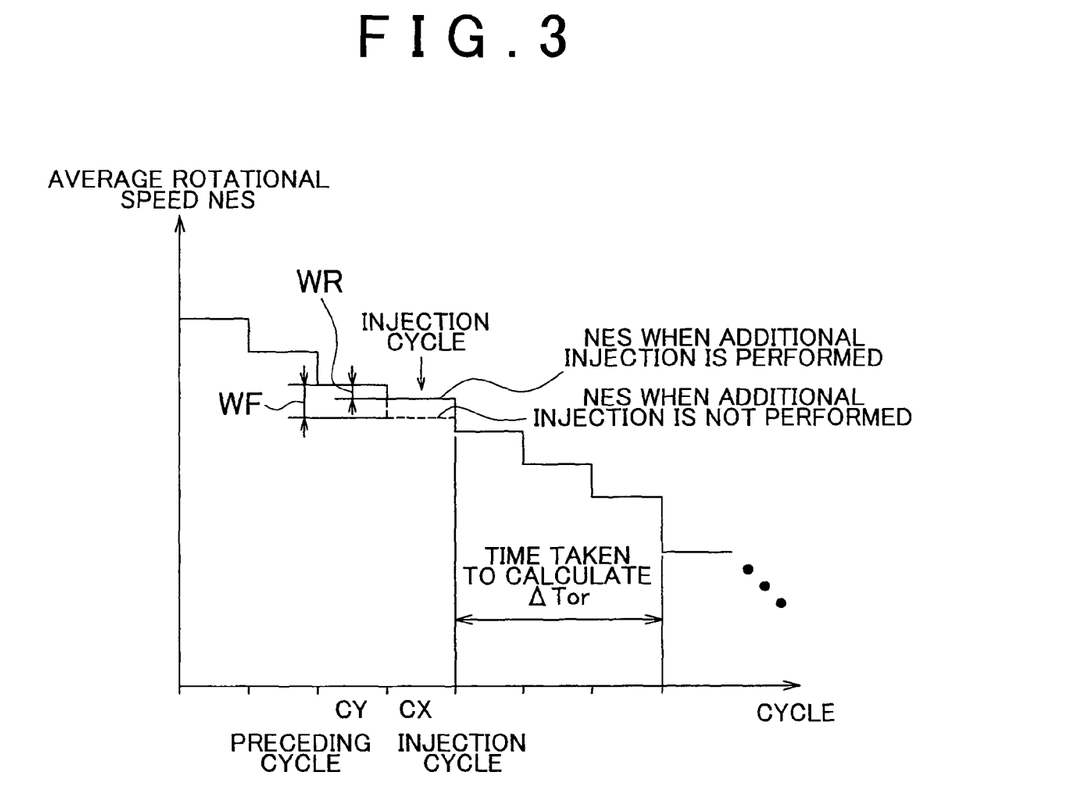
FIG. 3 is a graph showing a manner in which average rotational speed varies due to an additional injection in additional injection control performed by the controller of the embodiment.

Referring to FIG. 3, an outline of the additional injection control will be described. In the additional injection control, a plurality of fuel injections (additional injections) are performed while varying the injection timing from the advance side to the retard side during fuel cut in the diesel engine 1, and the amount of increase in torque due to each of the plurality of additional injections is calculated. Then, the injection timing (hereinafter referred to as the "misfire point") at which misfiring starts to occur is estimated based on the trend of variation in the amount of increase in torque as the injection timing shifts from the advance side to the retard side, and the cetane number of the fuel is estimated based on the estimated injection timing.

The calculation of the amount of increase in torque and the estimation of the misfire point are performed as follows. Specifically, in the additional injection control, a time period in which the combustion process in each cylinder 11 completes a cycle is one engine cycle, and the average value of the engine speed NE taken over the engine cycle is defined as average rotational speed NES. Then, the difference (hereinafter referred to as the "speed difference WR") between the average rotational speed NES in an engine cycle (hereinafter referred to as the "injection cycle CX") in which the additional injection is performed and the average rotational speed NES in an engine cycle (hereinafter referred to as the "preceding cycle CY") that is immediately before the injection cycle CX. In addition, the difference in the average rotational speed NES between the injection cycle CX and the preceding cycle CY that would result if no additional injection were performed (hereinafter referred to as the "speed difference WF") is also calculated. In addition, based on the difference between the speed difference WR and the speed difference WF (hereinafter referred to as the "speed variation amount $\Delta W$"), the amount of torque increased due to one additional injection (hereinafter also referred to as the "increase amount $\Delta Tor$") is calculated. After the torque increase amount $\Delta Tor$ is obtained, the subsequent additional injection is started. When it is assumed that no additional injection is performed, in an injection cycle CX, as shown by the broken line in FIG. 3, the average rotational speed NES is less than the average rotational speed NES in an injection cycle CX, in which an additional injection is performed, by the amount corresponding to the amount of fuel injected by the additional injection. The above calculations required to calculate the increase amount $\Delta Tor$ are started when the additional injection is performed. However, because it takes a certain period of time for calculation from when the calculations are started to when the increase amount $\Delta Tor$ is finally obtained, and the calculation time period normally extends over a plurality of engine cycles, a plurality of engine cycles are naturally completed by the time the following additional injection is performed, after the preceding additional injection is performed.

The trend of the variation of the increase amount $\Delta Tor$ as the additional injection timing shifts from the advance side to the retard side is determined based on the increase amount $\Delta \text{Tor}$ for each of the plurality of additional injections. The injection timing at which the increase amount $\Delta \text{Tor}$ rapidly drops is determined to be the misfire point, based on the trend of variation, and the determined misfire point is compared with the correspondence table between the misfire point and the cetane number obtained in advance, whereby the actual cetane number is estimated.

Thereafter, the main injection timing Tmain of the primary injection control that is calculated based on the standard cetane number CEN0 is adjusted based on the cetane number estimated as described above, and the manner, in which the main injection is performed, that is appropriate to the current fuel's cetane number is maintained, whereby the occurrence of increase in combustion noise, etc. due to the difference between the standard cetane number CEN0 and the actual cetane number CEN is suppressed.

Figure 4:
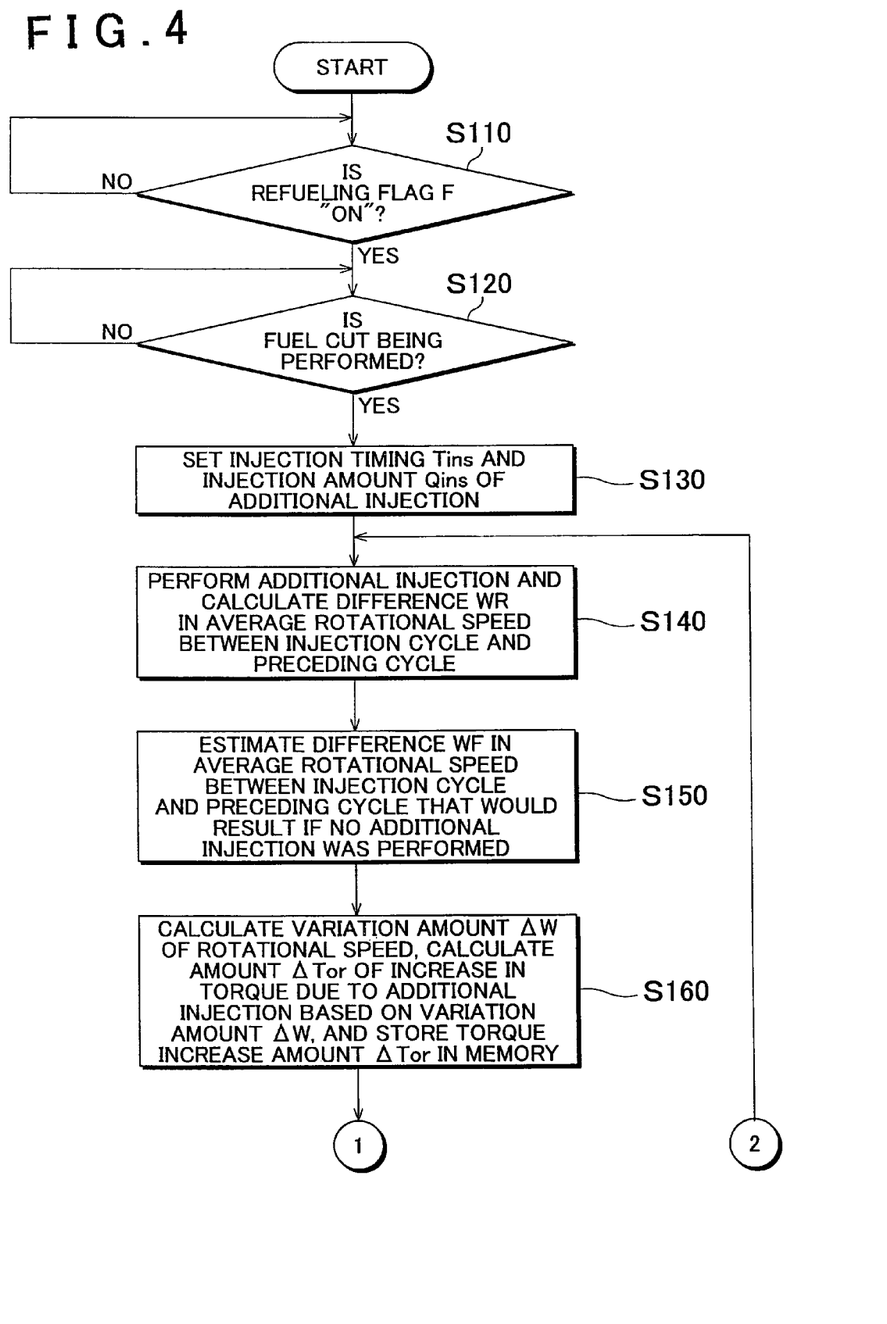
FIG. 4 is a flow chart showing a procedure of additional injection control performed by the controller of the embodiment.
Figure 5:
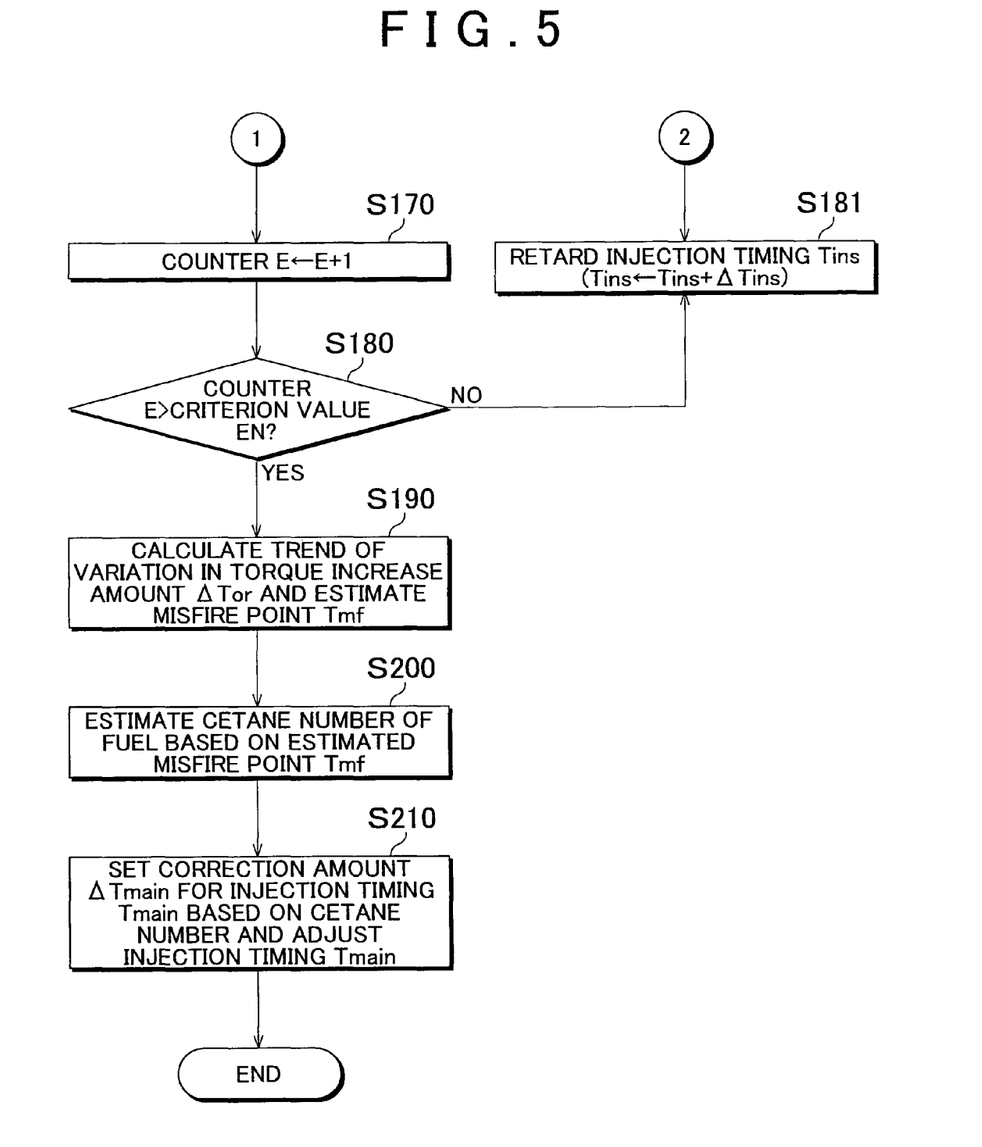
FIG. 5 is a flow chart showing the procedure of the additional injection control performed by the controller of the embodiment.

A procedure of controlling the additional injection will be described in detail with reference to the flow chart of the "additional injection control process" shown in FIGS. 4 and 5. The additional injection control process is started at step S110 when the electronic controller 100 is activated, and ends after step S210 is performed. Thereafter, this control process is suspended, and is again started from step S110 when the electronic controller 100 is activated next time. After step S210 is performed, this control process may be restarted immediately, or may be restarted after a predetermined period of time has elapsed.

In this process, it is determined whether a refueling flag F is "ON" (step S110). The refueling flag F is a flag that indicates whether refueling the fuel tank 53 has been performed after the preceding additional injection control is performed. The refueling flag F is set to "ON" when an increase in fuel level in the fuel tank 53 is detected by the fuel level sensor 115, while the refueling flag F is set to "OFF" after the estimation of the cetane number CEN (step S200) is performed.

When it is determined that the refueling flag F is "OFF" (NO in step S110), the determination process in step S110 is suspended until a preset, first standby time (an hour, for example) has elapsed, and when this standby time has elapsed, the determination process in step S110 is again performed. When there is a need to minimize the time period from when refueling the fuel tank 53 is actually performed to when a result to the effect that the refueling flag F is "ON" is obtained in the determination process, it is preferable that the first standby time be shortened according to the need.

On the other hand, when it is determined that the refueling flag F is "ON" (YES in step S110), it is determined whether fuel cut that is performed during deceleration of the vehicle is being performed (step S120). Specifically, when the vehicle speed V detected by the vehicle speed sensor 112 is decreasing, and at the same time, the depression amount Accp of the accelerator pedal 17 detected by the accelerator sensor 113 is "0", it is determined that fuel cut is being performed. On the other hand, when the vehicle speed V detected by the vehicle speed sensor 112 is not decreasing (during acceleration or idling), or when the depression amount Accp detected by the accelerator sensor 113 is greater than "0", it is determined that fuel cut is not being performed.

When it is determined that fuel cut is not being performed (NO in step S120), the determination process in step S120 is suspended until a preset, second standby time (10 seconds, for example) has elapsed, and when this standby time has elapsed, the determination process in step S120 is again performed. When there is a need to minimize the time period from when fuel cut is actually started to when a result to the effect that the fuel cut is being performed is obtained in the determination process, it is preferable that the second standby time be shortened according to the need.

When it is determined that fuel cut is being performed (YES in step S120), injection timing Tins of the additional injection is set to an initial value Tins0, and the amount Qins of injection of the additional injection is set to a little injection amount Qins0 (step S130). The initial value Tins0 is set so that, under conditions where the fuel injection amount is the little injection amount Qins0, misfire does not occur even when the cetane number CEN of the fuel is lower than the standard cetane number CEN0, and the initial value Tins0 is stored in the memory 100b in advance.

Then, the additional injection is performed according to the set injection timing Tins and injection amount Qins, and at the same time, the speed difference WR, which is the difference between the average rotational speed NES in the injection cycle CX and the average rotational speed NES in the preceding cycle CY, is calculated based on the signal output from the crank sensor 111 (step S140). In addition, the speed difference WF in the average rotational speed NES between the injection cycle CX and the preceding cycle CY that would result if no additional injection were performed, is also calculated (step S150). When no additional injection is performed, the engine speed NE monotonously decreases because fuel is being cut. Thus, it is possible to easily estimate the speed difference WF based on the manner in which the average rotational speed NES in cycles before the injection cycle varies.

Next, a speed variation amount $\Delta W$ that is the difference between the speed difference WR and the speed difference WF calculated above is calculated using the following formula (1), and the amount $\Delta \text{Tor}$ of increase in torque of the crankshaft 14 due to the additional injection is calculated from the calculation map based on the calculated variation amount $\Delta W$, and stored in the memory 100b (step S160).

$$\Delta W \leftarrow WR - WF \qquad (1)$$

The calculation map is stored in the memory 100b in advance, and when the variation amount $\Delta W$ is provided, the value of the increase amount $\Delta \text{Tor}$ that corresponds to the variation amount $\Delta W$ and that is appropriately adjusted in advance is output.

After the current additional injection control is started, that is, after the conditions in steps S110 and S120 are satisfied and the process in the steps from step S130 onward is therefore started, "1" is added to the counter E that indicates the number of times the additional injection is performed (step S170). Note that the counter E is set to the initial value "0" and stored in the memory 100b when the additional injection control is started.

Next, it is determined whether the counter E is greater than the criterion value EN, that is, whether the number of times the additional injection is performed in the current additional injection control reaches the predetermined total number (step S180). The criterion value EN is the value that indicates the total number of times the additional injection control is performed in the current additional injection control. The criterion value EN is set to a predetermined value and stored in the memory 100b in advance. When it is determined that the counter E is equal to or less than the criterion value EN (NO in step S180), the injection timing Tins of the additional injection is shifted to the retard side by a shift amount $\Delta$Tins (step S181), and thereafter, the process returns to step S140 to perform an additional injection at the shifted injection timing Tins.

In this way, until the counter E becomes greater than the criterion value EN, the injection timing Tins is shifted to the retard side by the shift amount ΔTins each time the shift is made, the additional injection is repeatedly performed, and the amount ΔTor of increase in torque due to each of the plurality of additional injections is stored in the memory 100b (steps S140 to S160). The period of time that is taken to complete the process in the steps S140 to S160 corresponds to the certain period of time that is required to calculate the torque increase amount ΔTor (see FIG. 3).

On the other hand, when it is determined that the counter E is greater than the criterion value EN (YES in step S180), the trend of variation in the amount ΔTor of increase in torque that accompanies the shift of the injection timing Tins from the advance side to the retard side is calculated based on the torque increase amount ΔTor calculated in the process of steps S140 to S160 each time the additional injection is performed and on the shifted injection timing Tins of the additional injection (see FIG. 9), and the injection timing (misfire point Tmf) at which misfiring starts to occur is estimated based on the trend of variation (step S190). Specifically, set as the misfire point Tmf is the injection timing at which the degree of variation in the torque increase amount ΔTor is the greatest, that is, the gradient of the curve representing the torque increase amount ΔTor is greatest while the injection timing Tins of the additional injection is shifted from the advance side to the retard side.

Next, the cetane number CEN of the fuel is calculated from the calculation map based on the estimated misfire point Tmf (step S200). The calculation map is stored in the memory 100b in advance, and when the misfire point Tmf is provided, the value of the cetane number CEN that corresponds to the misfire point Tmf and that is appropriately adjusted in advance is output. In the calculation map, the correspondences between the misfire point Tmf and the cetane number CEN are adjusted so that the more the misfire point Tmf shifts to the advance side, the lower the cetane number CEN becomes.

The adjustment amount ΔTmain for the injection timing Tmain of the main injection in the primary injection control is calculated from the calculation map based on the estimated cetane number CEN, and the injection timing Tmain is adjusted using the following formula (2) (step S210).

$$Tmain \leftarrow Tmain - \Delta Tmain \quad (2)$$

The calculation map is stored in the memory 100b in advance, and when the cetane number CEN is provided, the adjustment amount ΔTmain that corresponds to the cetane number CEN and that is appropriately adjusted in advance is output. In the calculation map, the correspondences between the cetane number CEN and the adjustment amount ΔTmain are adjusted so that the lower the cetane number CEN becomes, the greater the adjustment amount ΔTmain becomes. As a result, the lower the cetane number CEN is, the more the injection timing Tmain calculated in the primary injection control shifts to the advance side relative to the injection timing Tmain that is determined based on the standard cetane number CEN0.

Figure 6:
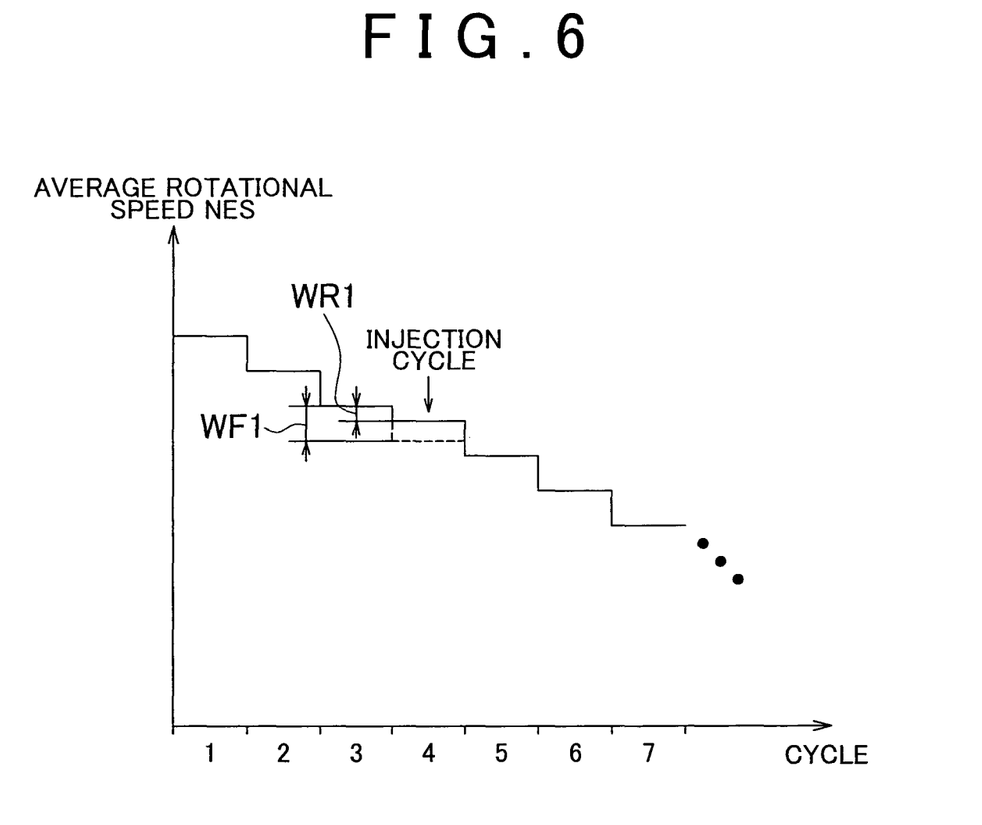
FIG. 6 is a graph showing a manner in which average rotational speed varies due to an additional injection in a specific example of additional injection control performed by the controller of the embodiment.
Figure 7:
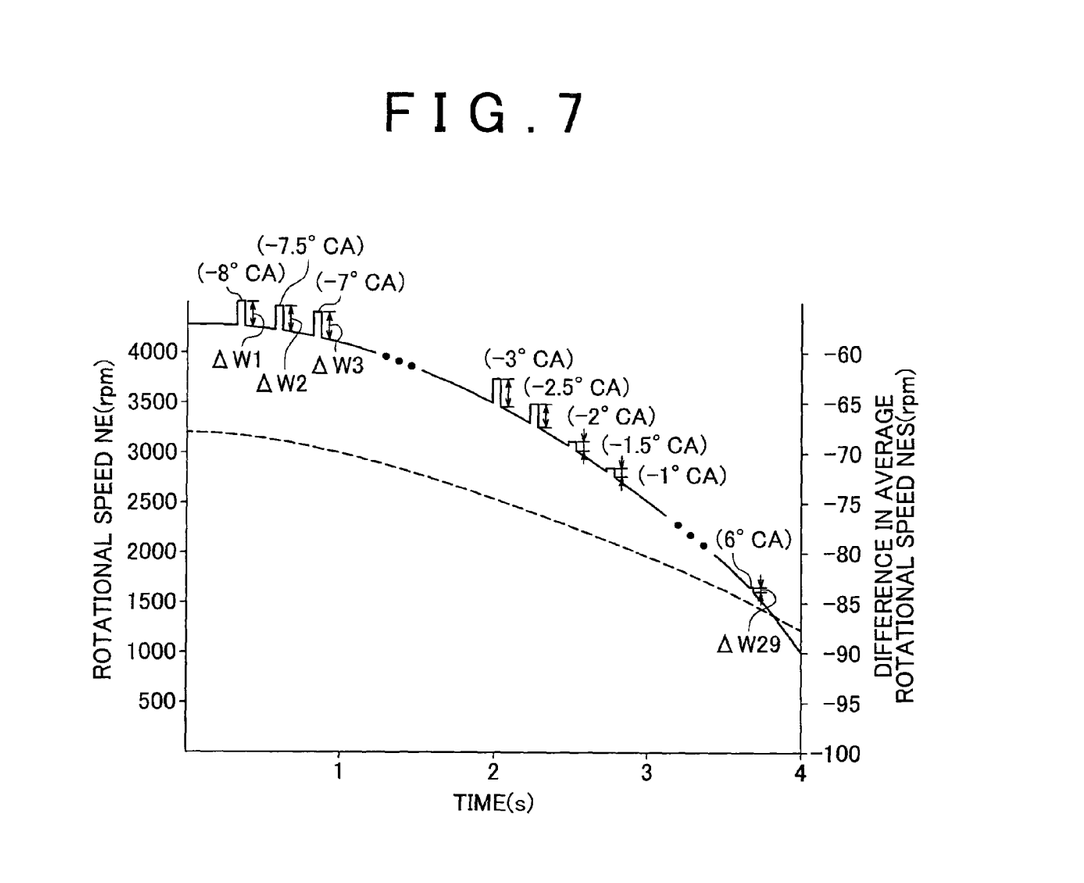
FIG. 7 is a graph showing a manner in which engine speed and the difference between the average rotational speed in an injection cycle and the average rotational speed in the preceding cycle vary with time in the specific example.
Figure 8:
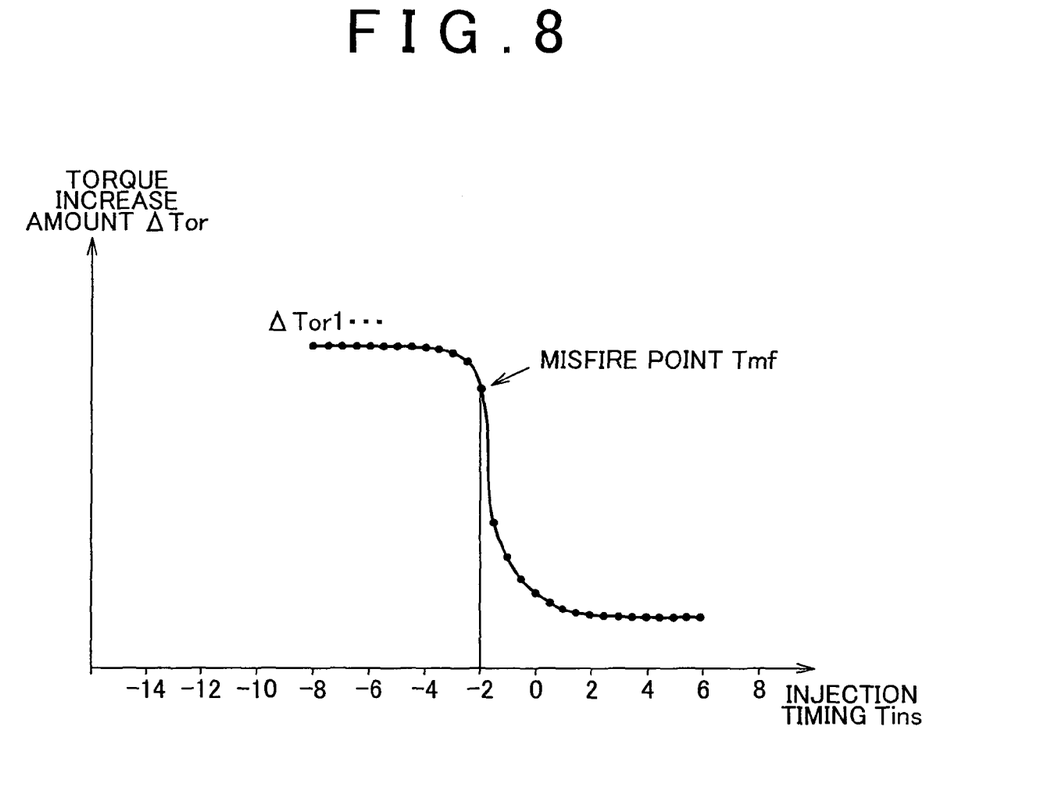
FIG. 8 is a graph showing the trend of variation in the amount of increase in torque with variation in injection timing in the specific example.
Figure 9A:
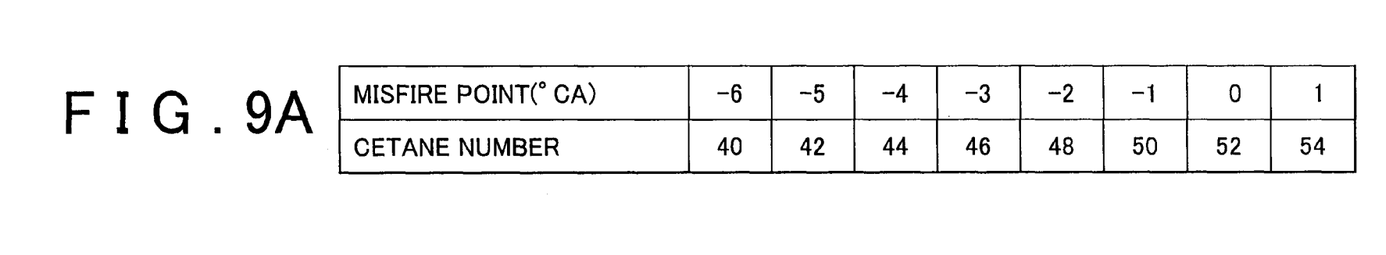
FIG. 9A is a table showing part of a calculation map for calculating the cetane number corresponding to a misfire point in the specific example.
Figure 9B:
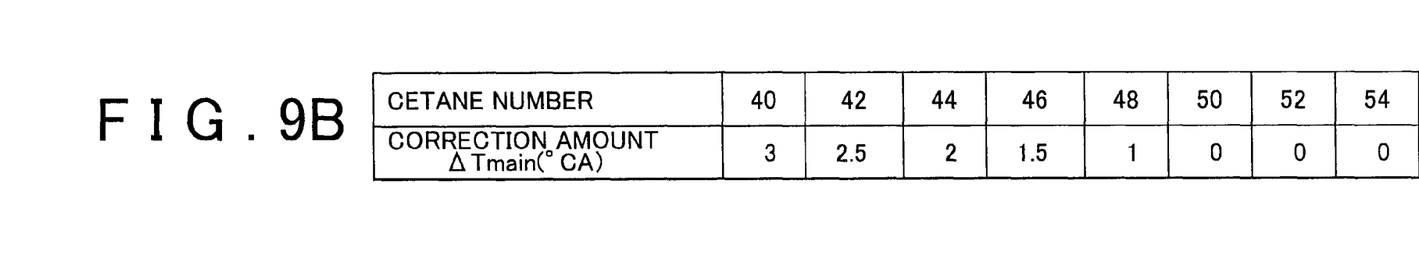
FIG. 9B is a table showing part of a calculation map for setting the adjustment amount corresponding to a cetane number in the specific example.

An example of the additional injection control process will be described with reference to FIGS. 6 to 9. FIG. 6 is a graph showing an example of the manner in which the average rotational speed NES varies while the additional injection control process is performed. FIG. 7 is a graph showing the manner in which the engine speed NE and the difference between the average rotational speed NES in the injection cycle and the average rotational speed NES in the preceding cycle vary with time while the additional injection control process is performed. FIG. 8 is a graph showing the trend of variation in the torque increase amount ΔTor with variation in the injection timing Tins. FIGS. 9A and 9B are tables showing part of the calculation maps for setting the adjustment amount ΔTmain.

In this specific example, when it is determined that refueling has been performed after the preceding additional injection control is performed (YES in step S110) and in addition, it is determined that fuel cut is being performed (YES in step S120), the injection timing Tins of the additional injection is set to the initial value Tins0 (−8 degree crank angle (° CA)) stored in the memory 100b, and an additional injection is performed (step S130).

As shown in FIG. 6, after the difference WR1 in the average rotational speed NES between the fourth engine cycle that is an injection cycle and the third engine cycle that is a preceding cycle is calculated (step S140), the difference WF1 in the average rotational speed NES between the fourth engine cycle and the third engine cycle that would result if no additional injection were performed (shown by the broken line in FIG. 6), is estimated (step S150).

Next, the speed variation amount ΔW1 (ΔW1=WR1−WF1) that is the amount of variation in the rotational speed of the crankshaft 14 due to the additional injection is calculated, and the amount ΔTor1 of increase in torque of the crankshaft 14 due to the additional injection is calculated based on the variation amount ΔW1 and is stored in the memory 100b (step S160). Next, the counter E is updated from the initial value "0" to "1" (step S170). Because the counter E ("1") is not greater than the criterion value EN ("28" in this example) at this time point (NO in step S180), the injection timing Tins is shifted to the retard side by a shift amount ΔTins (0.5° CA in this example) (step S181), and an additional injection is performed according to the shifted injection timing Tins (step S140).

In this way, as shown in FIG. 7, until the counter E becomes greater than the criterion value EN ("28"), the injection timing Tins is shifted to the retard side by the shift amount ΔTins (0.5° CA) each time the shift is made, and the additional injection is repeatedly performed. Specifically, as the engine speed NE decreases (broken line in the drawing), the injection timing Tins is shifted stepwise from "−8° CA" to "6° CA," and the amount ΔW of variation in speed due to each of the 29 times of additional injections in total is individually calculated.

As shown in FIG. 8, each time the additional injection is performed, the torque increase amount ΔTor1, ΔTor2, . . . ΔTor29 is calculated based on the speed variation amount ΔW1, ΔW2, ΔW29 and stored in the memory 100b, individually. In addition, the trend of variation in the amount ΔTor of increase in torque with the shift of the injection timing Tins from the advance side to the retard side is calculated, and the injection timing ("−2° CA" in this example) at which the variation is the greatest is set as the misfire point Tmf (step S190).

Then, it is estimated that the cetane number CEN of the current fuel is "48" from the calculation map shown in FIG. 9A, based on the estimated misfire point (−2° CA) (step S200).

Thereafter, based on the estimated cetane number CEN, the adjustment amount ΔTmain for the injection timing Tmain of the main injection that is set based on the standard cetane number CEN0 ("50" in this example) in the primary injection control is set to "1" with reference to the calculation map shown in FIG. 9B, and the injection timing Tmain is adjusted (Tmain←Tmain−1).

In the calculation map, when the cetane number CEN is lower than the standard cetane number CEN0 ("50"), the adjustment amount ΔTmain increases as the cetane number CEN decreases. On the other hand, when the cetane number CEN is equal to or greater than the standard cetane number CEN0 ("50"), the fuel ignition lag will not become longer than that when a fuel having the standard cetane number CEN0 is used, and therefore, the adjustment amount ΔTmain is set to "0" that gives the same cetane number as the standard cetane number CEN0.

According to the above-described embodiment, the following effects can be obtained. (1) In this embodiment, the injection timing at which the degree of variation in the amount ΔTor of increase in torque with the shift of the injection timing Tins of the plurality of additional injections from the advance side to the retard side becomes the greatest is set as the misfire point Tmf, and the cetane number of the fuel is estimated based on the misfire point Tmf. Because the amount ΔTor of increase in torque due to fuel combustion rapidly drops when misfiring starts to occur in the additional injection control, it is possible to accurately estimate the misfire point Tmf with the use of the above configuration. Because the lower the cetane number CEN of the fuel is, the more the misfire point Tmf shifts to the advance side, it is possible to accurately estimate the cetane number CEN of the fuel based on the estimated misfire point Tmf.

(2) In this embodiment, the lower the estimated cetane number CEN is, the more the injection timing Tmain of the main injection calculated in the primary injection control is adjusted to the advance side. Thus, even when the fuel ignition lag becomes long due to the decrease in the cetane number, it is possible to suppress the retardation of ignition timing of the fuel that is injected by a main injection.

(3) In this embodiment, conditions for performing the additional injection control include that the vehicle is decelerating and fuel cut is being performed, that is, that the condition for performing the primary injection control is not satisfied. Thus, the amount ΔTor of increase in torque due to the additional injection is calculated under conditions where there is no change in torque of the crankshaft 14 due to the primary fuel injection, and therefore, it is possible to more accurately and more easily detect the increase amount ΔTor.

(4) In this embodiment, it is determined whether refueling the fuel tank 53 has been performed after the preceding additional injection control is performed, and the current additional injection control is allowed to be performed on the condition that it is determined that refueling has been performed, as a result of this determination. Thus, because the additional injection control is surely performed when refueling has been performed, that is, when there is a possibility that the cetane number CEN of the fuel in the fuel tank 53 is changed, it is possible to reliably detect the change in the cetane number CEN of the fuel. In addition, it is possible to avoid estimating the cetane number twice or more from when a refueling is performed to when the subsequent refueling is performed. Thus, it is possible to simplify the control for estimating the cetane number CEN while realizing suitable monitoring of the cetane number CEN of the fuel.

Modification

The above embodiment is also implemented in the following form that is obtained by appropriately modifying the above embodiment. In the above embodiment, when the estimated cetane number CEN is equal to or greater than the standard cetane number CEN0, the adjustment amount ΔTmain is set to "0". However, the manner in which the adjustment amount ΔTmain corresponding to the estimated cetane number CEN is set is not limited to this. For example, in order to suitably suppress variation in torque of the crankshaft 14 due to change in the cetane number CEN, a configuration may be adopted in which, when the estimated cetane number CEN is equal to or greater than the standard cetane number CEN0, the higher the cetane number CEN is, the smaller the adjustment amount ΔTmain is set. In this case, the adjustment amount ΔTmain is set to a negative value, and the injection timing Tmain of the main injection in the primary injection control is adjusted to the retard side.

In the above embodiment, the injection timing Tmain of the main injection in the primary injection control is adjusted based on the estimated cetane number CEN. However, the manner in which the main injection is adjusted based on the cetane number is not limited to this. For example, the rail pressure PR, that is, the injection pressure of the main injection, that is set in the primary injection control may be adjusted based on the estimated cetane number CEN. Specifically, a configuration may be adopted in which the rail pressure PR is adjusted such that the lower the estimated cetane number CEN is, the higher the rail pressure PR that is set in the primary injection control becomes. As the rail pressure PR increases, the fuel ignition lag is shortened because the fuel injected by the main injection is well diffused and mixing of fuel and air is facilitated. Thus, when such a configuration is adopted, it is possible to more reliably suppress the retardation of ignition timing of fuel due to decrease in the cetane number.

The pilot injection amount Qpi that is set in the primary injection control may be adjusted based on the estimated cetane number CEN. Specifically, a configuration may be adopted in which the pilot injection amount Qpi that is set in the primary injection control is adjusted such that the lower the estimated cetane number CEN is, the greater the pilot injection amount Qpi becomes. As the pilot injection amount Qpi increases, the fuel ignition lag is shortened because the effect, brought about by a pilot injection, of activating the fuel injected by a main injection is enhanced. Thus, when such a configuration is adopted, it is possible to more reliably suppress the retardation of ignition timing of fuel due to decrease in the cetane number.

The pilot interval INTP that is set in the primary injection control may be adjusted so as to increase based on the estimated cetane number CEN. Specifically, a configuration may be adopted in which the pilot interval INTP is adjusted such that the lower the estimated cetane number CEN is, the longer the pilot interval INTP that is set in the primary injection control becomes. When the pilot interval INTP increases, the fuel ignition lag is shortened because the effect, brought about by a pilot injection, of activating the fuel injected by a main injection is enhanced. Thus, when such a configuration is adopted, it is possible to more reliably suppress the retardation of ignition timing of fuel due to decrease in the cetane number.

The invention may be implemented by combining two or more of the modifications related to the manner in which the main injection is adjusted. Specifically, a configuration may be adopted in which at least two of the injection timing Tmain, the rail pressure PR, the pilot injection amount Qpi, and the pilot interval INTP are adjusted based on the estimated cetane number CEN.

In the above-described embodiment, it is determined whether refueling the fuel tank 53 has been performed after the preceding additional injection control is performed, and the current additional injection control is allowed to be performed on the condition that it is determined that refueling has been performed, as a result of this determination. The invention is not limited to this, and a configuration may be adopted in which an additional injection control is performed every time the engine is started, for example.

In the above embodiment, the additional injection control is performed when the vehicle is decelerating and fuel cut is being performed. However, the invention is not limited to this. For example, the additional injection control may be performed when another condition is satisfied that indicates that the condition for performing the primary injection control is not satisfied, such as when a clutch for changing the state of connection between the crankshaft 14 and the driving wheels 16 is in a released state. The additional injection control may be performed when the condition for performing the primary injection control is satisfied, such as when the vehicle is idling. In this case, it is preferable that the additional injection be performed within a range such that the variation in torque of the crankshaft 14 due to the primary injections is negligible.

In the above embodiment, the amount $\Delta$Tor of increase in torque due to the additional injection is calculated based on the speed variation amount $\Delta$W, and the misfire point Tmf is estimated based on the trend of variation in the increase amount $\Delta$Tor. However, the manner in which the misfire point Tmf is estimated is not limited to this. For example, the amount $\Delta$Tor of increase in torque due to the additional injection may be calculated based on other parameters related to the combustion condition, such as the combustion pressure in the combustion chamber 18. The misfire point Tmf may be estimated based on the speed variation amount $\Delta$W without calculating the torque increase amount $\Delta$Tor.

In the above embodiment, a case is illustrated in which the controller of the invention is applied to a diesel engine mounted on a vehicle. However, the invention can be applied to another diesel engine, such as a diesel engine mounted on a ship, in a form similar to that of the above-described embodiment.

The invention claimed is:

1. A controller for a diesel engine that performs primary injection control in which primary injection of fuel is controlled based on an operational status of the diesel engine and additional injection control in which additional injection of the fuel is controlled for estimation of a cetane number of the fuel, the diesel engine controller comprising a control section that, as the additional injection control, causes a plurality of fuel injections to be performed at respectively different injection timings, calculates an amount of increase in torque of an engine output shaft due to each of the plurality of fuel injections, estimates injection timing at which misfiring starts to occur based on a trend of variation in the calculated amount of increase in torque as the injection timing of the plurality of fuel injections is shifted in one direction, and estimates the cetane number of the fuel based on the estimated injection timing, wherein the trend of variation in the amount of increase in torque is a trend of variation in the amount of increase in torque as the injection timing is shifted so that the injection timing of the plurality of fuel injections is shifted from an advance side to a retard side relative to a top dead center.

2. The diesel engine controller according to claim 1, wherein the control section determines, to be the injection timing at which misfiring starts to occur, injection timing at which the amount of increase in torque sharply varies in the trend of variation in the calculated amount of increase in torque.

3. The diesel engine controller according to claim 1, wherein the primary injection includes a main injection and a pilot injection that is performed before the main injection, and an injection manner of at least one of the main injection and the pilot injection is adjusted so that the lower the cetane number estimated by the controller is, the more advanced timing of injection of fuel that is injected by the main injection is.

4. The diesel engine controller according to claim 3, wherein timing of injection of fuel injected by the main injection is adjusted so that the lower the estimated cetane number is, the more advanced the timing of injection of fuel injected by the main injection is.

5. The diesel engine controller according to claim 3, wherein injection pressure at which the main injection is performed is adjusted so that the lower the estimated cetane number is, the higher the injection pressure is.

6. The diesel engine controller according to claim 3, wherein an injection amount for the pilot injection is adjusted so that the lower the estimated cetane number is, the greater the injection amount is.

7. The diesel engine controller according to claim 1, wherein the controller determines whether refueling a fuel tank for the diesel engine has been performed after preceding additional injection control is performed, and allows subsequent additional injection control to be performed on a condition that a result to the effect that refueling has been performed is obtained in this determination.

8. The diesel engine controller according to, claim 1, wherein the diesel engine is mounted on a vehicle, and the controller starts the additional injection control provided that the vehicle is decelerating and fuel cut is being performed.

9. The diesel engine controller according to claim 1, wherein the controller starts the additional injection control provided that a condition for performing the primary injection control is not satisfied.

10. A controller for a diesel engine that performs primary injection control in which primary injection of fuel is controlled based on an operational status of the diesel engine and additional injection control in which additional injection of the fuel is controlled for estimation of a cetane number of the fuel, the diesel engine controller comprising a control section that, as the additional injection control, causes a plurality of fuel injections to be performed at respectively different injection timings, calculates an amount of increase in rotational speed of an engine output shaft due to each of the plurality of fuel injections, estimates injection timing at which misfiring starts to occur based on a trend of variation in the calculated amount of increase in rotational speed as the injection timing of the plurality of fuel injections is shifted in one direction, and estimates the cetane number of the fuel based on the estimated injection timing, wherein the trend of variation in the amount of increase in rotational speed is a trend of variation in the amount of increase in rotational speed as the injection timing is shifted so that the injection timing of the plurality of fuel injections is shifted from an advance side to a retard side relative to a top dead center.

11. The diesel engine controller according to claim 10, wherein the primary injection includes a main injection and a pilot injection that is performed before the main injection, and an injection manner of at least one of the main injection and the pilot injection is adjusted so that the lower the cetane number estimated by the control section is, the more advanced timing of injection of fuel that is injected by the main injection is.

12. The diesel engine controller according to claim 11, wherein timing of injection of fuel injected by the main injection is adjusted so that the lower the estimated cetane number is, the more advanced the timing of injection of fuel injected by the main injection is.

13. The diesel engine controller according to claim 11, wherein injection pressure at which the main injection is performed is adjusted so that the lower the estimated cetane number is, the higher the injection pressure is.

14. The diesel engine controller according to claim 11, wherein an injection amount for the pilot injection is adjusted so that the lower the estimated cetane number is, the greater the injection amount is.

15. The diesel engine controller according to claim 11, wherein an interval between the pilot injection and the main injection is adjusted so that the lower the estimated cetane number is, the longer the interval is.

16. The diesel engine controller according to claim 10, wherein the control section determines whether refueling a fuel tank for the diesel engine has been performed after preceding additional injection control is performed, and allows subsequent additional injection control to be performed on a condition that a result to the effect that refueling has been performed is obtained in this determination.

17. The diesel engine controller according to claim 10, wherein the control section determines, to be the injection timing at which misfiring starts to occur, injection timing at which the amount of increase in rotational speed sharply varies in the trend of variation in the calculated amount of increase in rotational speed.

18. The diesel engine controller according claim 10, wherein the control section starts the additional injection control provided that a condition for performing the primary injection control is not satisfied.

19. The diesel engine controller according to claim 17, wherein an interval between the pilot injection and the main injection is adjusted so that the lower the estimated cetane number is, the longer the interval is.

20. The diesel engine controller according to claim 10, wherein the diesel engine is mounted on a vehicle, and the control section starts the additional injection control provided that the vehicle is decelerating and fuel cut is being performed.

21. A method of controlling a diesel engine, comprising:
performing primary injection control in which primary injection of fuel is controlled based on an operational status of the diesel engine; and
performing additional injection control in which additional injection of the fuel is controlled for estimation of a cetane number of the fuel,
wherein the performing additional injection control includes:
causing a plurality of fuel injections to be performed at respectively different injection timings;
calculating an amount of increase in torque of an engine output shaft due to each of the plurality of fuel injections;
estimating injection timing at which misfiring starts to occur based on a trend of variation in the calculated amount of increase in torque as the injection timing of the plurality of fuel injections is shifted in one direction; and
estimating the cetane number of the fuel based on the estimated injection timing;
wherein the trend of variation in the amount of increase in torque is a trend of variation in the amount of increase in torque as the injection timing is shifted so that the injection timing of the plurality of fuel injections is shifted from an advance side to a retard side relative to a top dead center.

22. A method of controlling a diesel engine, comprising:
performing primary injection control in which primary injection of fuel is controlled based on an operational status of the diesel engine; and
performing additional injection control in which additional injection of the fuel is controlled for estimation of a cetane number of the fuel,
wherein the performing additional injection control includes:
causing a plurality of fuel injections to be performed at respectively different injection timings;
calculating an amount of increase in rotational speed of an engine output shaft due to each of the plurality of fuel injections;
estimating injection timing at which misfiring starts to occur based on a trend of variation in the calculated amount of increase in rotational speed as the injection timing of the plurality of fuel injections is shifted in one direction; and
estimating the cetane number of the fuel based on the estimated injection timing,
wherein the trend of variation in the amount of increase in rotational speed is a trend of variation in the amount of increase in rotational speed as the injection timing is shifted so that the injection timing of the plurality of fuel injections is shifted from an advance side to a retard side relative to a top dead center.

* * * * *